July 30, 1963    R. RABL    3,099,042
PROCESS AND APPARATUS FOR PRODUCING A POROUS RESIN PLATE
Filed June 24, 1958
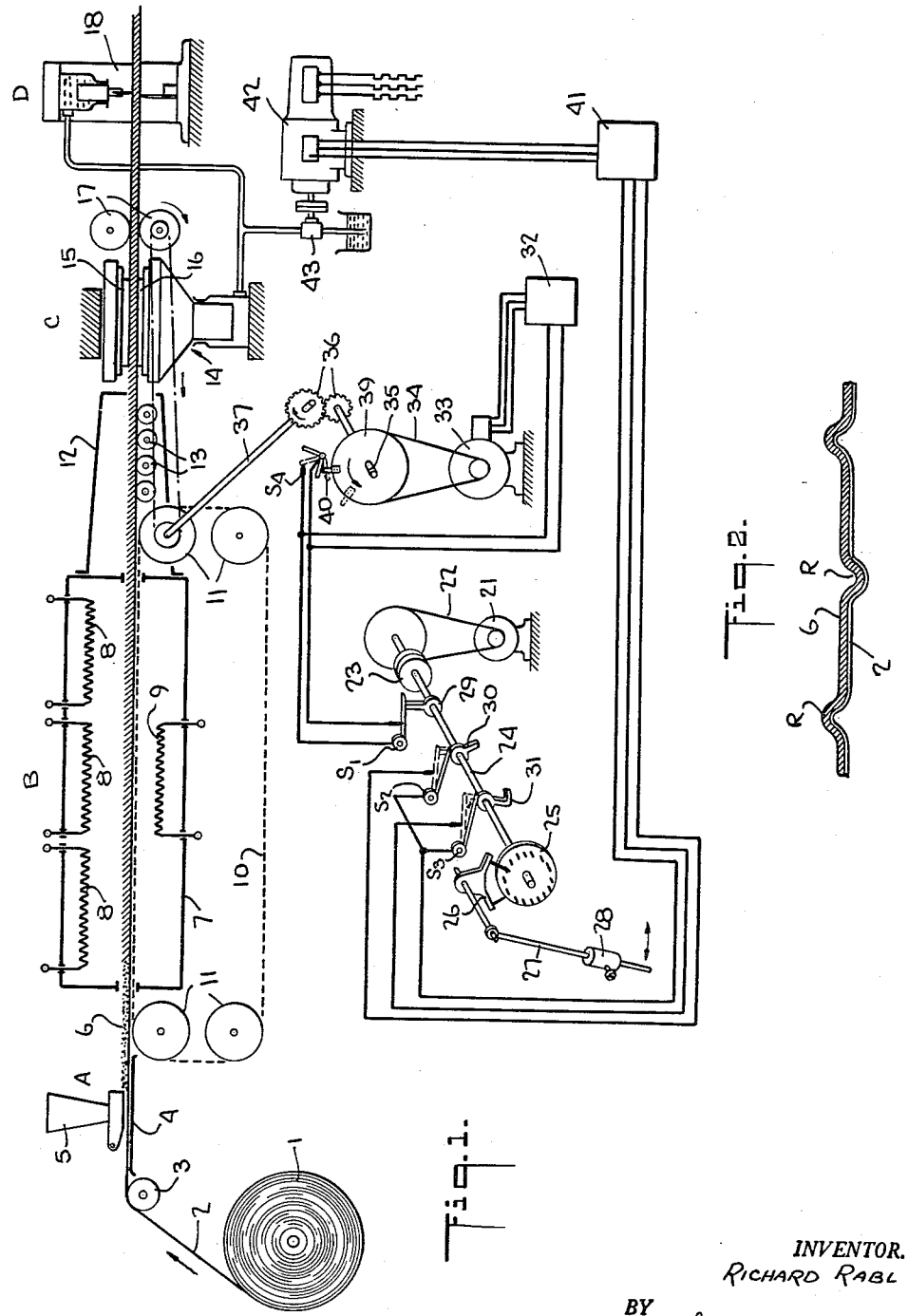
INVENTOR.
RICHARD RABL
BY
AGENT

United States Patent Office 3,099,042
Patented July 30, 1963

3,099,042
PROCESS AND APPARATUS FOR PRODUCING A POROUS RESIN PLATE
Richard Rabl, Vienna, Austria, assignor to Varta Aktiengesellschaft, Frankfurt am Main, Germany, a corporation of Germany
Filed June 24, 1958, Ser. No. 744,284
Claims priority, application Austria June 29, 1957
7 Claims. (Cl. 18—4)

The present invention relates to improvements in the manufacture of porous plates of synthetic resin and more particularly of separator plates for storage batteries.

It is known to produce sintered plastic plates by forming a layer of synthetic resin powder on an endless moving support, such as a drum or an endless band, carrying the powder layer on the support through a heating zone where the powder is sintered, compressing the sintered layer between pressure rollers or the like to produce a continuous length of a porous synthetic resin body, and cutting the cooled synthetic resin body into individual plates of the desired dimension.

Furthermore, it has been proposed to produce sintered separator plates of synthetic resin for storage batteries by depositing synthetic resin powder on adjacent plate supports moving at changing speed through the operating circle, the speed being reduced in the powder feed zone so that the plate supports are in contact with each other and form a continuous support in the feed zone while it is increased to separate the supports in the heating and molding zones, the separate layers of sintered powder being there subjected to the intermittently actuated molding press whose working cycle is synchronized with the movement of the separate supports through the press. This method is particularly advantageous in the manufacture of profiled or grooved plates, the plate supports having the desired surface configuration to give the adjacent surface of the sintered layer its form while the press imparts the desired form to the other surface of the layer, thus producing a plate with two grooved surfaces. Such surface shaping of both sides of the sintered plates has not been possible when an endless flexible band was used as support since the required flexibility of the band does not permit the use of longitudinal molding ribs thereon.

It is the primary object of the present invention to provide a simple and economical manufacturing method for producing sintered synthetic resin plates with shaped surfaces without the use of individual support plates. According to this invention, the surfaces of the sintered plates may be shaped by means of relatively small and exchangeable molds or matrices which may be replaced on the molding press according to the desired shape of the surfaces.

It is a concomitant object of the present invention to provide a novel apparatus for carrying out the method according to the present invention and to provide a novel plate useful as a separator plate for storage batteries.

In accordance with the invention, a synthetic resin powder layer is deposited on a moving support of a continuous length of a flexible material, such as paper, a woven or non-woven fabric or the like. The flexible support with its layer of synthetic resin powder is then moved through a heating zone where the powder is sintered. The sintered powder layer on the flexible support is subsequently moved to a molding zone where the sintered powder layer and its flexible support are given the desired surface shape, and the shaped layer is finally cooled and cut into plates of the desired dimension.

As will be appreciated, the flexible support fulfills three tasks in the production of the profiled sintered plates of this invention. First, it serves as a carrier for the loose powder and the sintered layer; secondly, it is the means by which the still hot sintered layer, which has practically no tensile strength, is transported from the sintering zone into the molding and cooling zone; and, finally, its flexibility enables the press to shape both sides of the layer since the flexible support is simply deformed by the mold and transposes its shape to the adjacent side of the sintered layer. It does not matter if the shaped flexible support tears in places under the pressure of the mold because, after pressing and cooling, the sintered synthetic resin body has sufficient tenacity to pull the soft sintered body ahead of the mold by means of those portions of the support adhering to the sintered body.

In accordance with one preferred embodiment of the present invention, the flexible support is moved forward intermittently through a stationary two-part mold and the closing movement of the mold is synchronized with the forward movement of the support so that the mold is actuated during each pause of the intermittent forward movement. This not only simplifies the structure but has the added advantage that the molded and cooled portion of the sintered body is completely solid before the next forward movement so that it has enough tensile strength to pull the succeeding portion which has not yet been shaped and solidified. Therefore, even very thin paper can be used as the flexible support in this embodiment of the invention. Such a thin support has the added advantage of absorbing almost no heat during the sintering of the powder layer so that practically no sintering heat is lost on account of the support.

The flexible support may be supplied in the form of a continuous band from a roll and may either be stripped from the solidified sintered body or may remain laminated therewith.

According to a further feature of the invention, the solidified sinter body with or without its flexible support is cut into plates of the desired length, the actuation of the cutting means being preferably synchronized with that of the mold if the mold and the cutting means are stationary. In this manner, it is only necessary to conform the length of each forward movement of the support to the desired plate length.

Accordingly, a preferred apparatus for the manufacture of profiled sintered bodies according to this invention comprises, in sequence, a supply roll for a flexible support band, means for depositing a powder layer on the support band, a heating means through which the support band passes, an intermittently actuatable stationary molding press, a pair of pressure rollers for griping the powder layer and support and pulling them through the molding press, cutting means actuated in synchronism with the molding press, and control means for alternately actuating the moving means for the support band, on the one hand, and the molding press and the cutting means, on the other hand.

The above and other objects, advantages, and features of the invention will be more fully understood by reference to the following detailed description of an embodiment of an apparatus designed for the practice thereof, as illustrated in the accompanying drawing, without in any way limiting the scope of the invention to the illustrated embodiment.

In the drawing,

FIG. 1 schematically illustrates the apparatus with its control circuit; and

FIG. 2 is a transverse section of a separator plate produced according to the present invention.

Referring now to the drawing, the apparatus is shown to include essentially a powder feeding or depositing zone A, a heating or sintering zone B, a shaping zone C, and a cutting zone D through which the powder layer travels first in loose powder form, then sintered, subsequently molded and cooled into a shaped sintered body, and finally cut into plates. Mounted at one end of the apparatus is supply roll 1 carrying a continuous length of a band or ribbon of flexible material, such as paper or a woven or non-woven fabric. The flexible band 2 is directed over guide roller 3 onto stationary table 4. A powder feeding means including hopper 5 is mounted over the table to deposit a powder layer on the flexible band 2.

The present invention is not concerned with the specific powder feeding and depositing means and any such suitable means may be used, such as, for instance, the apparatus disclosed and claimed in co-pending application Serial No. 744,288, now Patent No. 3,024,948, filed on even date herewith and entitled "Apparatus for Forming a Layer of Pulverulent Material," or Austrian Patent No. 188,096.

The deposited powder layer 6 then travels on band 2 through the sintering oven 7 whose electrical heating coils 8, 9 are schematically indicated above and below the powder layer. The flexible support 2 with its powder layer 6 is carried through the sintering oven on the endless screen 10 which intermittently moves about rollers 11 in a manner to be described hereinafter. The sintered powder layer is protected after leaving the oven by a thermally insulated cover 12 and carried to the molding press over a series of identical rollers 13. The stationary press 14 comprises two mold parts or matrices 15 and 16 which are hydraulically controlled and intermittently actuated in synchronism with the forward movement of the endless screen 10, i.e. the press is closed when the endless screen stands still. The matrices are water-cooled in a manner well known per se so that the sintered powder layer is cooled and thus solidified simultaneously with its shaping in the mold. The solidified sintered powder body with its flexible support band is gripped in the nip of pressure rollers 17 which are positively driven in the direction of the arrow to pull the sintered body through the press. Following the pressure rollers 17 is a hydraulically operated knife 18 to cut the sintered body into desired lengths and thus to produce the finished plates.

It is obvious from the above description that the flexible support of the powder layer, i.e. paper or the like, makes it possible to advance the layer while first loose and then sintered but not yet solidified through feeding zone A and heating zone B to zone C and between matrices 15, 16 of the stationary press 14. The molding pressure and cooling at 14 solidifies the synthetic resin powder layer sufficiently to have it gripped and pulled by pressure rollers 17 without damage to the layer. Since the support 2 is flexible, both surfaces of the layer may be shaped in the press 14 because the flexible support will readily conform to the shaped surface of the layer under slight tensioning or stretching. Even if the support is thin enough to be torn in places, the operation of the apparatus will continue satisfactorily because the synthetic resin layer will be sufficiently solid after opening of the press to permit it to transmit the pulling force of rollers 17 to the undamaged subsequent portion of the support which, in turn, will carry along the layer portion which is not yet solidified and, therefore, has no appreciable tensile strength of its own.

After the shaping operation, the flexible support has completed its essential function and may, therefore, be stripped from the sintered synthetic resin shaped body. However, it is possible and, for certain purposes, desirable, to leave the flexible support on the sintered body and to cut the laminated strip into the finished plates, for instance, separator plates for storage batteries. Depending on whether the flexible support is a fibrous web adapted to become felted with the sintered body or a smooth band, for instance, of tissue paper, which has little adherence to the sintered body, the flexible support will be separated from the separator plate under the action of the electrolyte in the storage battery. This action, however, does not interfere with the operation of the battery.

The production of good porous plates of sintered synthetic resin requires the observance of strict operating conditions in respect of the sintering temperature and duration as well as molding pressure and time. Accordingly, the different operating steps are preferably controlled in accordance with this invention by a synchronizing network. In the illustrated embodiment, this network includes a driving motor 21 which rotates switch shaft 24, being connected thereto by belt drive 22 and friction coupling 23. Ratchet wheel 25 is mounted at the other end of the switch shaft 24, with the pallets of escapement 26 engaging the ratchet wheel 25. The axle upon which the escapement is mounted and pivots carries at its outer end a pendulum rod 27 with a glidably adjustable pendulum weight 28. Depending on the position of the weight on the rod, the pendulum has a longer or shorter amplitude of oscillation, the time of each pendulum swing controlling the length of the intermittent movements of the synchronized parts of the apparatus. Connected to the driving motor by friction coupling 23, the switch shaft 24 rotates intermittently in accordance with the engagement and disengagement of the pawl-and-ratchet control actuated by the swinging pendulum 27, 28.

The switch shaft 24 carries cams 29, 30, 31 which actuate respective switches $S_1$, $S_2$ and $S_3$. The electrical circuit controlled by switch $S_1$ includes the relay 32 which actuates the motor 33 serving to provide the forward drive. Belt drive 34 connects the driving motor 33 with the transmission shaft 35 which operates gears 36 to drive shaft 37. Shaft 37 is operatively connected to one of the rollers 11 for driving the endless screen 10. A chain drive 38 drives the pressure rollers 17 in synchronism with the endless screen 10, the chain drive connecting the shaft 37 with the pressure rollers 17. The transmission shaft 35 makes one full rotation for each forward step in the intermittent movement of the band 2 through the apparatus. This is accomplished by so arranging the switch $S_1$ that it closes the relay 32 only for a short time, thus actuating motor 33. Motor 33 rotates pulley 39 which carries a pin 40. The pin 40 engages the switch spring of switch $S_4$ at the start of operations (illustrated) to keep the switch open. After the pulley 39 has been rotated slightly, the pin 40 no longer engages the switch spring and switch $S_4$ is closed before switch $S_1$ is opened. The relay 32, therefore, remains closed for the remainder of the forward movement cycle, due to the closure of auxiliary switch $S_4$ and is opened only after a full rotation of transmission shaft 35, which will cause pin 40 to engage the switch spring of switch $S_4$ again, thus opening the switch. The flexible support 2 is moved forwardly a given distance between the time of actuation of switch $S_1$ and opening of switch $S_4$, which distance may be adjusted by the chosen size of reduction gears 36. The forward movement distance of each operating cycle determines the length of the finished sintered plate.

The molding and cutting operations must be effected during pauses in the intermittent forward movement. For this purpose, cam 30 is so mounted on switch shaft 24 that it actuates switch $S_2$ after switch $S_4$ is opened. Switch $S_2$ controls an electrical circuit including relay 41 which actuates motor 42 driving gear pump 43. The gear pump 43 supplies pressure fluid to the hydraulic cylinder 44 of the molding press 14 and to the hydraulic cylinder of the knife 18. In this manner, the press and the cutting means are actuated simultaneously and at a time when the support 2 stands still so that the sintered powder layer may be shaped and cooled in the press 14 while an advanced portion of the solidified layer is cut into the desired plate size. After a period of time depending on the length of the arm of switch $S_2$, the cam 30 again releases the switch, thus opening the circuit to relay 41 and stopping motor 42. Motor 42 is provided with a slip ring armature having resistances in its circuit. Such a motor will produce rapid operation of the press and, due to its characteristic of considerable speed reduction under increasing pressure, the press operation will be self-regulating.

After switch $S_2$ is opened, cam 31 will actuate switch $S_3$ connected to relay 41 under phase inversion to drive motor 42 in the opposite direction and thereby to open the press and the knife. This concludes one operating cycle and further rotation of switch shaft 24 will again actuate switch $S_1$ to start another and identical cycle encompassing the forward movement of the support 2 through the heating, molding and cutting stations.

With the above-described control system, the distance of each intermittent forward movement may be controlled by use of suitable reduction gears 36 and the duration of each full operating cycle may be adjusted by suitable positioning of weight 28 on pendulum rod 27. Accordingly, the heating time of the powder traversing the sintering oven may be adjusted to the optimal value and may be kept constant and independent of possible changes in the voltage or frequency of the electric power source.

Any suitable synthetic resin powder which may be sintered can be used in the practice of the present invention, such as polyvinyl resins, including polyvinyl chloride or acetate, polyvinyl carbazole, polystyrene, acrylic and methacrylic acid polymers and polyesters, polyethylene, and blends and copolymers of these and like polymers.

FIG. 2 illustrates an embodiment of a separator plate produced according to this invention. This plate is a laminated body comprising a flexible support 2, for instance of paper, and sintered synthetic resin body 6. Both surfaces of the plate are profiled, as shown, alternating ribs R extending along the surfaces in opposite directions.

Specific sintering temperatures and times for different synthetic resin powders being well know per se, together with preferred molding pressures and conditions for such sintered bodies, these conditions form no part of the present invention. Accordingly, the following specific example is presented merely for purposes of illustration and in no way limits the scope of the invention.

*Example*

A layer of polystyrene powder having a specific surface of 4000 sq. cm./g. is deposited on a wrapping paper support of 0.1 mm. thickness in a layer thickness of 1.9 mm. The driving motor 21 is operated at 1300 r.p.m. and the weight 28 is so adjusted that the pendulum swings through one amplitude in 0.8 second. The switch cams are so arranged that the support 2 moves forwardly 30.7 cm. between actuation of switch $S_1$ and opening of switch $S_4$, the duration of one full rotation of the switch shaft or of one operating cycle being 33 seconds. The powder layer remains in the sintering oven for 240 seconds, being there subjected to a sintering temperature of 235° C. The sintered layer was subjected to a pressure of 5 kg./sq. cm. in the hydraulic press 14 to be shaped into the form shown in FIG. 2.

While the invention has been described and illustrated in conjunction with a preferred embodiment, it will be clearly understood that many modifications and variations may occur to the skilled in the art, particularly after they have benefitted from the present teaching, without departing from the spirit and scope of this invention as defined in the appended claims.

I claim:
1. A method of producing shaped porous synthetic resin plates, said method comprising the successive steps of depositing a synthetic resin powder layer on a flat support of a continuous length of a non-conductive, readily deformable, flexible material, moving the support with the layer of synthetic resin powder intermittently through a heating and subsequent shaping zone, sintering the powder layer in the heating zone to form a porous body, pulling the support with the porous body through the shaping zone, shaping and simultaneously cooling the porous body and its support in the shaping zone without destroying the porosity of the porous body, the porous body being solidified by the cooling, and the porous body and its support standing still between intermittent forward movements while being shaped, and cutting the porous body into plates.

2. The method of claim 1, wherein the distance of each forward movement corresponds to the desired length of the plates and the shaping and cutting steps are synchronized to be effected simultaneously.

3. An apparatus for producing shaped porous synthetic resin plates, said apparatus comprising a supply of a flexible support band of a non-conductive, readily deformable material, means for depositing a layer of synthetic resin powder on the support band, a heating means for sintering the powder layer, means for moving the support with the powder layer through the heating means, a stationary molding press, means for actuating the press, means for pulling the support band with the sintered powder layer through the molding press, and control means synchronized for alternately actuating the support moving and pulling means to impart an intermittent forward movement to the support band and the press actuating means for actuating the press when the support band stands still between intermittent forward movements.

4. The apparatus of claim 3, also comprising a laterally stationary cutting means arranged beyond the support band pulling means and synchronized for actuation simultaneously with the press.

5. An apparatus for producing shaped porous synthetic resin plates, said apparatus comprising a supply of a flexible support band of non-conductive, readily deformable material, means for depositing a layer of synthetic resin powder on the support band, a heating means for sintering the powder layer, means for moving the support with the powder layer through the heating means, a stationary molding press, means for actuating the press, means for pulling the support band with the sintered powder layer through the molding press, and control means synchronized for alternately actuating the support moving and pulling means to impart an intermittent forward movement to the support band and the press actuating means for actuating the press when the support band stands still between intermittent forward movements, said control means including a pendulum having means for changing its amplitude of oscillations, a rotating switch shaft carrying a plurality of switch actuating cams, means for controlling the rotation of the switch shaft in response to the pendulum oscillations, a drive motor for driving the support band moving and pulling means, another drive motor for driving the molding press actuating means, a first electrical circuit for energizing said first-named motor, and a second electrical circuit for energizing the other drive motor, the electrical circuits comprising switches controlled by said cams and being alternately opened and closed thereby.

6. The apparatus of claim 5, wherein one of the cams on said switch shaft actuates a switch in said first electrical circuit and another switch is connected in said circuit, a control element for said other switch being actuated by the first-named drive motor to open said other switch at predetermined intervals corresponding to the intermittent movement of the support band.

7. The apparatus of claim 6, comprising a replaceable reduction gear means connected between said first-named motor and said support band moving and pulling means.

References Cited in the file of this patent

UNITED STATES PATENTS

| | | |
|---|---|---|
| 924,555 | Jenkins | June 8, 1909 |
| 2,289,250 | Denning | July 7, 1942 |
| 2,309,571 | Bruce | Jan. 26, 1943 |
| 2,334,233 | Wood | Nov. 16, 1943 |
| 2,509,354 | Jones et al. | May 30, 1950 |
| 2,513,434 | Tinsley | July 4, 1950 |
| 2,624,768 | Toulmin | Jan. 6, 1953 |
| 2,677,008 | Fairclough et al. | Apr. 27, 1954 |
| 2,717,423 | Uhlig et al. | Sept. 13, 1955 |
| 2,745,141 | Brennan | May 15, 1956 |
| 2,822,573 | Wasniewski | Feb. 11, 1958 |
| 2,850,559 | Stickel | Sept. 2, 1958 |
| 2,913,773 | Hassel | Nov. 24, 1959 |

FOREIGN PATENTS

| | | |
|---|---|---|
| 523,813 | Italy | Apr. 19, 1955 |